Figure 1:
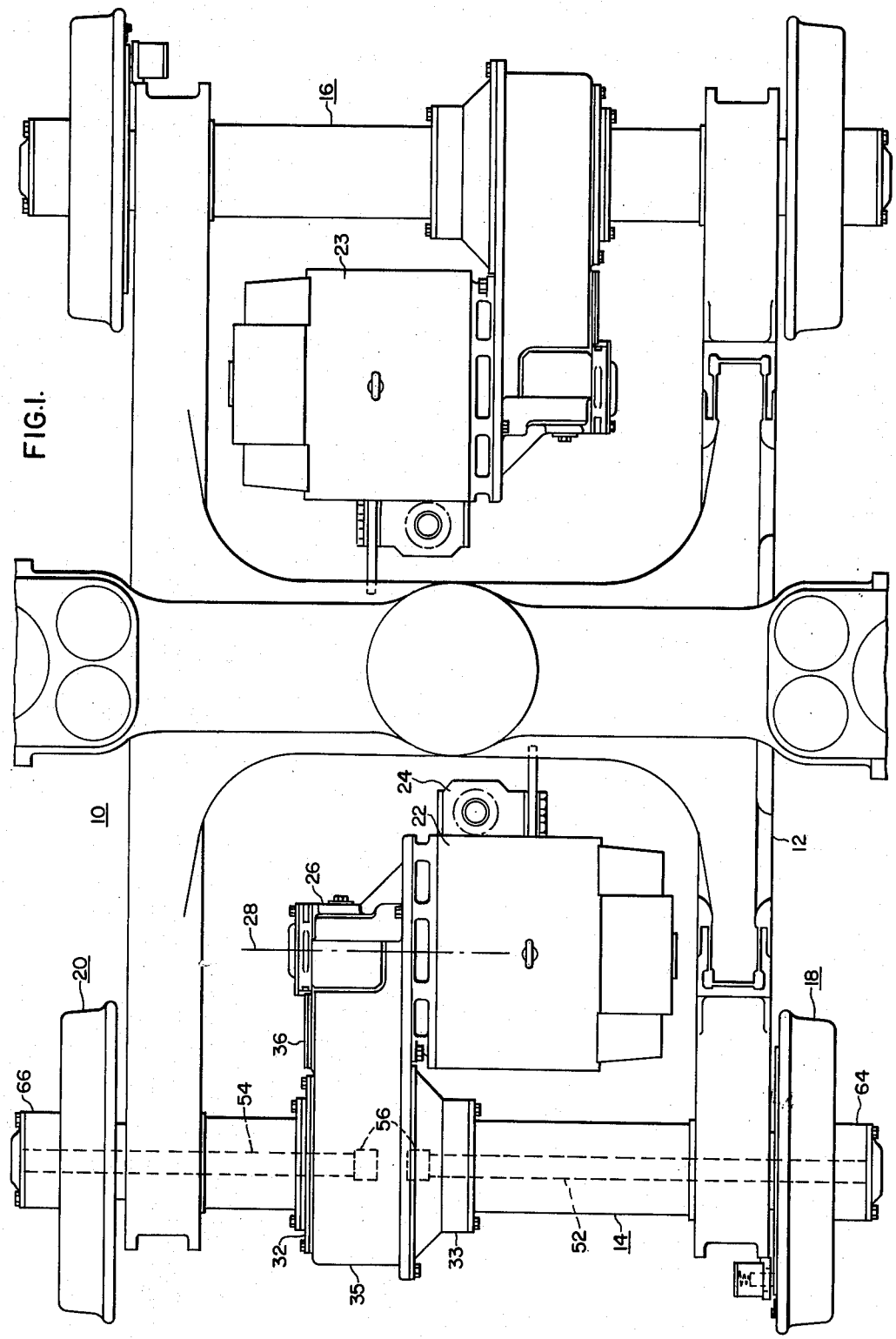

United States Patent Office 3,244,117
Patented Apr. 5, 1966

3,244,117
PARALLEL DRIVE TRACTION SYSTEM WITH DIFFERENTIAL SPEED MECHANISM
Charles A. Yuhas, North Huntingdon Township, Irwin, Pa., assignor to Westinghouse Electric Corporation, East Pittsburgh, Pa., a corporation of Pennsylvania
Filed Sept. 30, 1964, Ser. No. 400,470
13 Claims. (Cl. 105—96.1)

The present invention relates to parallel drive traction systems for rail trucks and the like, and more particularly it relates to parallel drive traction systems in which a differential speed mechanism is provided.

In a traction power system for a traction truck, there is normally provided an electric traction motor and a gear reduction unit which in turn is coupled with an axle of the truck. Drive power developed in the motor is transmitted to the truck wheels through the axle. The truck as a whole can have various transport uses, for example a car body can be supported on it for passenger transit use.

With growing interest in rapid transit for urban passenger service, there has been evidenced increasing consideration of the need of a differential speed mechanism in the traction drive system. This need is based on the desirability of eliminating wheel squealing on curves and reducing wheel wear generally.

It is common practice to incorporate a differential speed mechanism in a right angle drive system such as in gasoline powered automobiles and trucks. In traction trucks, there is evidence to indicate that a parallel drive system is advantageous from a maintenance or service standpoint, and it is, therefore, desirable that a structural arrangment be devised for incorporating a differential speed mechanism in the parallel drive traction power system.

In accordance with the board principles of the present invention, a drive system for a traction truck comprises a traction motor and a gear unit flexibly supported on a truck frame and coupled in parallel drive relation to an axle of the truck through a differential speed mechanism. Support means direct the loading of the motor, gear unit, an outer fixed housing of the diffedential speed mechanism, and the frame directly to the wheels of the truck rather than through the axle. Because the axle is inaccessible in at least one embodiment of the invention, there is also provided a ground circuit for the motor through a brush which directly engages a grounding disc on at least one of the truck wheels.

It is therefore an object of the invention to provide a novel parallel traction drive system in which "commonly axled" wheels can be operated at different speeds.

Another object of the invention is to provide a novel parallel traction drive system in which the truck and drive system load is transmitted directly to the truck wheels rather than through the truck axle so as to permit the use of a comparatively thinner and more easily heat treated axle.

It is a further object of the invention to provide a novel parallel traction drive system which results in a truck of comparatively less overall weight.

An additional object of the invention is to provide a novel traction drive system in which a grounding circuit bypasses all of the support bearings by means of a direct connection to one or more of the wheels.

Figure 2:
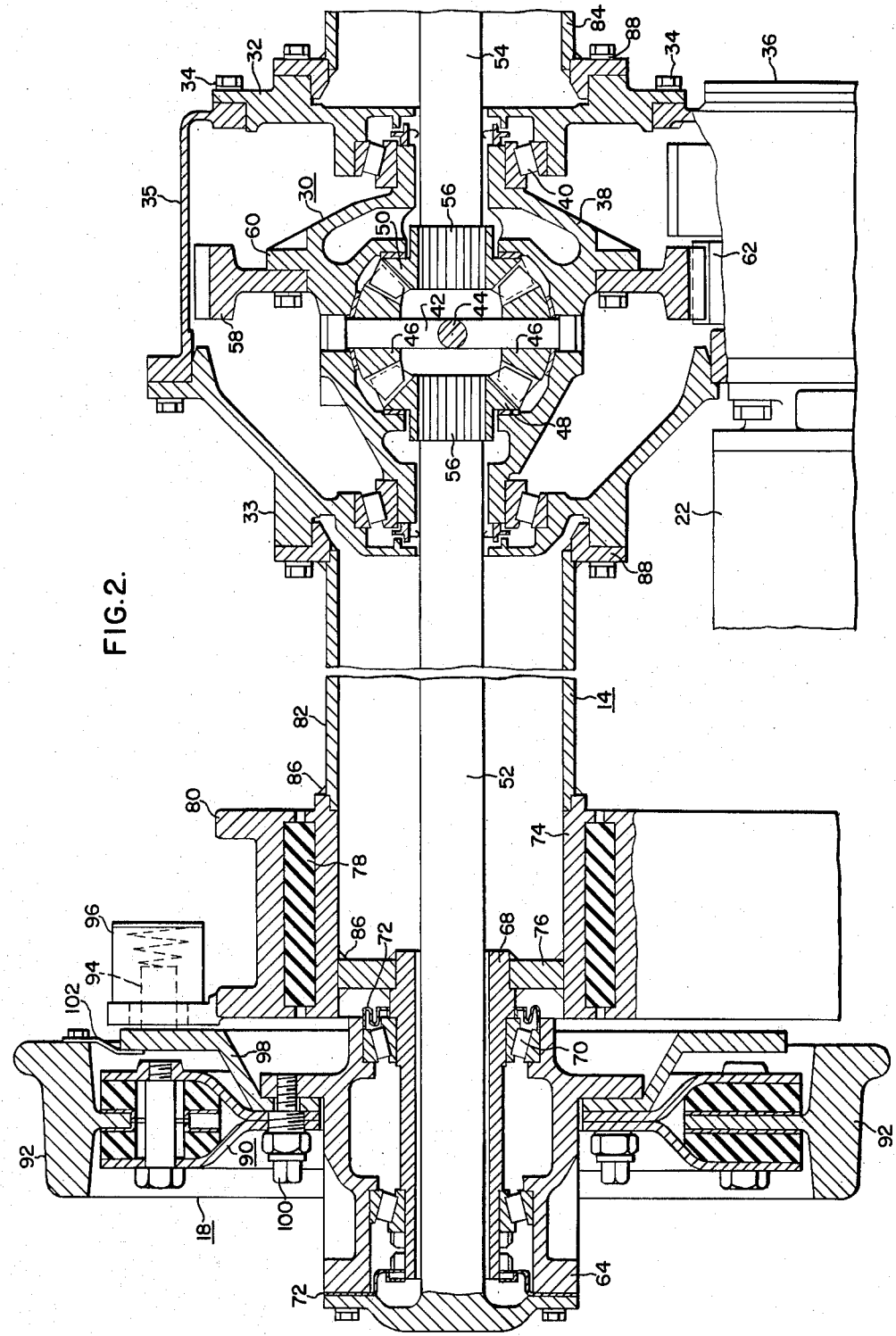

These and other objects of the invention will become more apparent upon consideration of the following detailed description along with the attached drawing, in which:

FIGURE 1 shows a top plan view of a traction truck constructed in accordance with the principles of the invention; and FIG. 2 shows parts of a cross-section through the truck so as to illustrate a differential speed mechanism and axle and wheel structure embodied therein.

More specifically, there is shown in the drawing a truck 10 having a frame 12 supported in relation to a pair of axle means 14 and 16 each of which is provided with a pair of wheels 18 and 20 spaced from each other to an extent which enables the truck 10 to be used on a track of predetermined gauge. As previously described, a car body (not shown) or other structure for a variety of possible transport uses can be supported on the truck 10.

An electric traction motor 22 of suitable design and rating is mounted on the frame 12 for driving the axle means or "axle" 14 and it is supported at one or more points by suitable flexible support means 24. Since the support means 24 does not specifically form a part of the present invention, it will not be further described here. As an example, it can be structurally organized in the manner set forth in a copending patent application S.N. 218,932, entitled "Traction Power Unit Suspension" filed by E. O. Mueller on August 23, 1962 and assigned to the present assignee. Another identical motor 23 and associated drive structure can be similarly mounted for driving the axle means or "axle" 16. Only the motor 22 and structure associated therewith will be described because of its identity with the motor 23.

A gear unit 26 is coupled with the motor 22 for the purpose of reducing the drive speed, and to conserve space the gear unit 26 and the motor 22 are preferably designed and manufactured as an integrated device. As denoted by reference line 28, the axis of rotation of the primary drive power is parallel to the axle 14 so as to characterize the system with parallel drive operation. As indicated previously, the parallel drive provision is preferred in many quarters because of advantages in service and maintenance when the truck 10 is placed in use.

To provide for differential wheel speed, a differential speed mechanism 30 is disposed on the axle 14, and it is preferably a commercially available structure known as a standard high traction type differential mechanism. However, special differential mechanism designs can fall within the purview of the invention.

Although the differential mechanism 30 is in this case a commercially available design, it will be described briefly as an aid to the reader's understanding of the invention. Generally, a pair of fixed end plates 32 and 33 are provided for the differential mechanism 30 primarily to provide bearing support therefor but also to provide part of the enclosure or housing means necessary for splash lubrication of the moving parts of the differential mechanism 30. Gear unit housing 36 includes end portion 35 which generally extends around the differential mechanism 30 to provide the balance of the housing means and full enclosure therefor; and the plates 32 and 33 are engaged by bolt or other securing means 34 to the gear unit housing 36. Lubricant is free to splash commonly within the gear unit 26 and about the differential mechanism 30.

Within the differential fixed housing means or the gearing housing portion 35 and the fixed differential plates 32 and 33 there is provided a rotatable housing 38 supported by bearings 40 in relation to the fixed plates 32 and 33. The rotatable housing 38 carries a pair of cross shafts 42 and 44 and each arm of each shaft 42 or 44 is provided with a bevel gear 46 which engages opposite differential side gears 48 and 50. Drive power is thus transmitted to the wheels 18 and 20 through respective axle portions 52 and 54 which are splined as indicated by the reference character 56 to the differential side gears 48 and 50.

As is well understood in the pertaining art, the side gears 48 and 50 and the rotatable differential housing 38 rotate as a single mass when loading on the associated wheels 18 and 20 is substantially equal. If the loading on one of the wheels 18 or 20 is decreased, the associated side gear 48 or 50 relatively increases its rotational speed to increase the rotational speed of the underloaded wheel. However, to assure traction under all conditions including those in which one of the wheels has substantially zero load on it, the differential mechanism 30 preferably is of the exemplified type, namely a high traction or torque bias or limited slip type.

The gearing within the gear unit 26 can be arranged as desired but preferably provides for double reduction in the drive speed. Coupling means between the gear unit 26 and the differential mechanism 30 comprises an output gear 58 secured or bolted to a flange 60 on the differential rotatable housing 38. Drive power thus is transmitted to the differential rotatable housing 38 from the motor 22 through the gear unit gearing including intermediate gear 62 which meshes with the output gear 58.

End support for the axle portions 52 and 54 is provided by hubs 64 and 66 of the wheels 18 and 20. As observed in the drawing, the axle portion 52 is longer than the axle portion 54 so that the differential mechanism 30 is disposed in a location where the resultant center of gravity of the drive train is substantially along the longitudinal center line of the truck 10. Since the long and short axles 52 and 54 support substantially no external load, the axle cross-section can be materially less than that normally required in a conventional journaled load supporting axle. Heat treatment for improved axle strength properties is thus facilitated and overall truck weight is comparatively reduced.

Within each wheel hub 64 or 66, there is journaled an end support member or tube 68 by means of bearings 70 which are sealed if desired by suitable means 72. The end tubular members 68 form a part of support means which support the frame 12 and further provide added support for the motor 22 and the gear unit 26, in this case through the fixed differential housing plates 32 and 33. The main truck load thus is directly transmitted to the wheel hubs 64 and 66 through the end tubular support members 68 and the bearings 70.

The structure employed in the balance of the support means to effect the direct load transmittal includes an intermediate tubular member 74 supported on each end tubular member 68 and about the associated axle 52 or 54 by means of an inwardly extending flange 76. An annular resilient member 78 is disposed about each intermediate tubular member 74 so as to provide flexible support for the frame 12 through frame support rings 80.

In addition, an inner tubular support member 82 or 84 encompasses the long axle 52 or the short axle 54 and extends inwardly from each intermediate tubular support member 74 so as to support the fixed differential housing or end plates 32 and 33. The tubular support members can be secured to each other by any suitable means such as by welding as indicated by the reference character 86. The inner tubular support members 82 and 84 can be secured to the fixed differential end plates 32 and 33 by any suitable means, such as by flange and bolt means indicated by the reference character 88. Since in this instance the fixed differential end plates 32 and 33 and thus the gear unit 26 are supported directly by the hubs 64 through relatively rigid material, it is preferable that the wheels 18 and 20 be resilient as by the employment of flexible structure 90 between the hub 64 and associated tread 92 of the wheel 18 or 20.

Since the long axle 52 and the short axle 54 are in this case encompassed by the tubular truck support means, grounding of the electrical power circuits cannot readily be accomplished through the axle in the conventional manner. Grounding of the truck frame directly to at least one of the wheel treads 92 on each axle 14 or 16 is provided by a brush 94 disposed in a brush holder 96 which in turn is mounted on the frame 12 or one of the frame rings 80. The brush 94 engages a conductive disc-like member 98 mounted on the associated wheel hub 64 with the flexible structure 90 by suitable securing means such as bolt means 100. In this case, a strap connector 102 can be extended between the grounding disc 98 and the tread 92 to assure a complete ground return circuit which bypasses the wheel bearings 70 and the differential bearings 40.

The foregoing description has been set forth only to illustrate the principles of the invention. Accordingly, it is desired that the invention be not limited by the embodiment described, but, rather, that it be accorded an interpretation consistent with the scope and spirit of its principles.

What is claimed is:

1. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, and means substantially excluding said axle means for supporting said frame and said differential mechanism in relation to said wheels.

2. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, said differential mechanism having a rotatable housing, said motor and gearing means having an output gear secured to said differential mechanism rotatable housing so as to transmit drive power to said axle means, and means substantially excluding said axle means for supporting said frame and said differential mechanism in relation to said wheels.

3. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, said differential mechanism having a rotatable housing, said rotatable housing having an outwardly extending flange disposed thereon, said motor and gearing means having an output gear bolted to said rotatable housing flange so as to transmit drive power to said axle means, and means substantially excluding said axle means for supporting said frame and said differential mechanism in relation to said wheels.

4. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, and means substantially excluding said axle means for supporting said frame and said differential mechanism in relation to said wheels, said supporting means comprising a hub of each wheel and tubular means secured to said differential mechanism and extending along and about said axle means and having respective outer ends thereof journaled within said wheel hubs.

5. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, said coupling means comprising a rotatable housing of said differential mechanism, said motor and gearing means having an output gear secured to said differential mechanism rotatable housing so as to transmit drive power to said axle means, and means substantially excluding said axle means for supporting said frame and said differential mechanism in relation to said wheels, said supporting means comprising a hub of each wheel and tubular means secured to said differential mechanism and extending along and about said axle means and having respective outer ends thereof journaled within said wheel hubs.

6. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, and means for supporting said frame and said differential mechanism in relation to said wheels, said supporting means comprising a hub of each wheel and tubular means secured to said differential mechanism and extending along and about said axle means and having respective outer ends thereof journaled within said wheel hubs, said axle means having opposite ends thereof extending through said tubular means outer ends and secured respectively to said wheel hubs, said supporting means further including flexible means supporting said frame in relation to said tubular means.

7. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, and means substantially excluding said axle means for supporting said frame and said differential mechanism in relation to said wheels, said axle means including a long axle and a short axle on opposite sides of said differential mechanism, the respective lengths of said long and short axles selected to provide a center of gravity of said motor and gearing means and said differential mechanism substantially on the longitudinal center line of said truck.

8. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, means substantially excluding said axle means for supporting said frame and said differential mechanism in relation to said wheels, said supporting means comprising a hub of each wheel and an end tubular support member journaled within each wheel hub, said differential mechanism having fixed outer housing means, and tubular means secured to said fixed housing means of said differential mechanism and extending along and about said axle means and having respective outer ends thereof supported on said end tubular support members.

9. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, said coupling means comprising a rotatable housing of said differential mechanism, said motor and gearing means having an output gear secured to said differential mechanism rotatable housing so as to transmit drive power to said axle means, means substantially excluding said axle means for supporting said frame and said differential mechanism in relation to said wheels, said supporting means comprising a hub of each wheel and an end tubular support member journaled within each wheel hub, said differential mechanism having fixed outer housing means, and tubular means secured to said fixed outer housing means of said differential mechanism and extending along and about said axle means and having respective outer ends thereof supported on said end tubular support members.

10. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, means substantially excluding said axle means for supporting said frame and said differential mechanism in relation to said wheels, said supporting means comprising a hub of each wheel and an end tubular support member journaled within each wheel hub, said differential mechanism having fixed outer housing means, and tubular means secured to said fixed outer housing means of said differential mechanism and extending along and about said axle means and having respective outer ends thereof supported on said end tubular support members, said axle means comprising respective axle portions extending outwardly from opposite sides of said differential mechanism and through said tubular means and said end tubular support members into engagement with said wheel hubs.

11. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, means for supporting said frame and said differential mechanism in relation to said wheels, said supporting means comprising a hub of each wheel and an end tubular support member journaled within each wheel hub, said differential mechanism having fixed outer housing means, and tubular means secured to said fixed outer housing means of said differential mechanism and extending along and about said axle means and having respective outer ends thereof supported on said end tubular support members, said axle means comprising respective axle portions extending outwardly from opposite sides of said differential mechanism and through said tubular means and said end tubular support members into engagement with said wheel hubs, said supporting means further including flexible means supporting said frame on said tubular means.

12. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, means for supporting said frame and said differential mechanism in relation to said wheels, said supporting means comprising a hub of each wheel and an end tubular support member journaled within each wheel hub, said differential mechanism having fixed outer housing means, and tubular means secured to said fixed outer housing means of said differential mechanism and extending along and about said axle means and having respective outer ends thereof supported on said end tubular support members, said axle means comprising respective axle portions extending outwardly from opposite sides of said differential mechanism and through said tubular means and said end tubular support members into engagement with said wheel hubs, said supporting means further including flexible means supporting said frame on said tubular means, each of said wheels having an outer tread, and flexible means supporting each wheel hub in relation to the associated tread.

13. A differential speed traction drive system for a traction truck, said system comprising axle means and traction motor and gearing means having its drive power axis of rotation substantially parallel with said axle means, a pair of wheels at opposite ends of said axle means, a frame on which said motor and gearing means are supported, a differential mechanism operatively connected with said axle means for effecting different speeds for said wheels under predetermined conditions, means coupling said motor and gearing means to said differential mechanism, means for supporting said frame and said differential mechanism in relation to said wheels, said supporting means comprising a hub of each wheel and an end tubular support member journaled within each wheel hub, said differential mechanism having fixed outer housing means, tubular means secured to said fixed outer housing means of said differential mechanism and extending along and about said axle means and having respective outer ends thereof supported on said end tubular support members, said axle means comprising respective axle portions extending outwardly from opposite sides of said differential mechanism and through said tubular means and said end tubular support members into engagement with said wheel hubs, and brush means supported on said frame, conductive means including a grounding disc-like member on at least one of said wheels cooperating with said brush means to provide a grounding circuit from said frame to a tread of at least one of said wheels.

References Cited by the Examiner

UNITED STATES PATENTS

| | | | |
|---|---|---|---|
| 1,748,309 | 2/1930 | Rose | 104—28 |
| 1,867,678 | 7/1932 | Rayburn | 105—62 |
| 2,036,194 | 4/1936 | Burrows et al. | 105—118 |
| 2,276,848 | 3/1942 | Kjolselh | 105—108 |
| 2,322,149 | 6/1943 | Lewis | 105—117 |
| 2,432,907 | 12/1947 | Langer | 105—108 |
| 2,575,409 | 11/1951 | Cooper et al. | 339—5 |
| 2,685,621 | 8/1954 | Callender | 191—45 |
| 2,809,242 | 10/1957 | Dean | 191—45 |
| 2,981,916 | 4/1961 | O'Brien | 339—5 |
| 3,117,430 | 1/1964 | Mueller | 64—9 |
| 3,152,557 | 10/1964 | Mueller | 105—108 |
| 3,152,558 | 10/1964 | Mueller | 105—133 |

ARTHUR L. LA POINT, *Primary Examiner.*

B. FAUST, *Assistant Examiner.*